United States Patent [19]

Sakaguchi et al.

[11] 3,860,542

[45] Jan. 14, 1974

[54] PROPYLENE RESIN COMPOSITION

[75] Inventors: Fumio Sakaguchi; Kenji Takemura; Yukio Oda, all of Kanagawa, Japan

[73] Assignee: Showa Denko Kabushiki Kaisha, Tokyo, Japan

[22] Filed: Mar. 28, 1973

[21] Appl. No.: 345,609

[30] Foreign Application Priority Data

Mar. 31, 1972 Japan.............................. 47-31757

[52] U.S. Cl............. 260/23 H, 161/247, 260/41 B, 260/94.9 GA, 260/876 B
[51] Int. Cl......................... C08f 19/14, C08f 21/04
[58] Field of Search............ 260/23 H, 41 B, 27 EV, 260/94.9 GA; 161/247, 876 B

[56] References Cited
UNITED STATES PATENTS

| | | | |
|---|---|---|---|
| 2,554,461 | 5/1951 | Howes et al. | 260/23 H |
| 2,973,285 | 2/1961 | Berke | 117/106 |
| 3,071,566 | 1/1963 | Casser | 260/27 EV |
| 3,196,134 | 7/1965 | Donat | 260/78.5 |
| 3,239,478 | 6/1963 | Harlan | 260/27 R |
| 3,324,060 | 6/1967 | Scopp | 260/23 H |
| 3,352,817 | 11/1967 | Meyer | 260/94.9 GA |

*Primary Examiner*—Donald E. Czaja
*Assistant Examiner*—William E. Parker
*Attorney, Agent, or Firm*—Sughrue, Rothwell, Mion, Zinn & Macpeak

[57] ABSTRACT

A propylene resin composition comprising a propylene polymer, or a copolymer of propylene and one or more components copolymerizable with propylene, and alumina trihydrate having a gibbsite crystal structure, and various moldings produced from the propylene resin composition having excellent physical and chemical properties are disclosed.

30 Claims, No Drawings

PROPYLENE RESIN COMPOSITION

BACKGROUND OF THE INVENTION

1. Field of the Invention

This invention relates to a propylene resin composition comprising a propylene polymer, or a copolymer of propylene and one or more components copolymerizable with propylene, and alumina trihydrate having a gibbsite crystal structure.

2. Description of the Prior Art

Resin compositions comprising more than 100 parts by weight of various reinforcing inorganic fillers per 100 parts by weight of olefinic polymers, such as ethylene polymers or propylene polymers, are well known in the art as disclosed in, for example, Japanese Patent Publication Nos. 8037/65 and 29377/71 and British Patent No. 936,057.

Although these resin compositions can be obtained at low cost and are improved in certain physical properties, these resin compositions have disadvantages in that the fillers lower the inherent physical properties of moldings produced from such resin compositions and it is very difficult to incorporate a large amount of inorganic fillers, e.g., more than 70% by weight based on the weight of the olefinic polymers. Further, it is difficult to obtain moldings having a uniform composition from a mixture of olefinic polymers and inorganic fillers even if a large amount of filler could be incorporated into the olefinic polymers. In thermoplastic resins generally used, it is also necessary to use fillers having low cost in order to avoid economical problems.

compositions comprising olefinic polymers and reinforcing inorganic fillers, for example, β-type alumina hydrate as disclosed in Japanese Patent Publication No. 8037/65, show high modulus, tensile strength and hardness, but they also exhibit low flexibility, tear strength and toughness. When smaller proportions of inorganic fillers are used in these compositions to eliminate the above disadvantages, the flexibility and tear strength are improved to a certain degree but mixing costs increase, an economically advantageous products cannot be obtained. Further, when proportions of inorganic fillers are decreased, i.e., the olefinic polymers are used in a large proportion, the products obtained from such compositions evolve considerable heat when they are subjected to combustion, e.g., when burned as rubbish after use, and such products give forth large volumes of black smoke or soot during combustion. In addition, these products are readily flammable and are not suitable for use as structural materials. Resin compositions comprising a large proportion fo alumina trihydrate having a gibbsite crystal structure are excellent in flexibility, but sheets of films produced from such compositions generally retain a waxy feeling on their surfaces and are not excellent in marking and printing properties. This is due to the fact that the surfaces of the sheets or films lack roughness and/or a hydrophilic property in view of the nature of lipophilic thermoplastic resins. Further, a composition comprising a thermoplastic resin and aluminum hydroxide, which has been subjected to removal of free water and subsequently dried [obtainable from sodium aluminate in the production of alumina hydrate (aluminum hydroxide)], generally exhibits poor dispersibility because of partial aggregatation of the particles, and moldings produced from such a composition sometimes have undesirable spots on the surfaces of the moldings and lack a uniform hydrophilic property.

In order to improve the hydrophilic property, a method comprising immersing the moldings in an aqueous solution of soldium hydroxide having a high concentration or in concentrated sulfuric acid at high temperature and for a long period of time to elute the aluminum hydroxide contained in the moldings has been proposed. Though this method improves the printing and marking properties of the moldings to a certain extent, it also deteriorates or deforms the moldings and adversely affects the mechanical properties of the moldings since the moldings are subjected to severe conditions.

As a result of research to develop propylene resin compositions containing a large amount of inorganic fillers, it was found that a propylene resin composition comprising as main components a propylene polymer and alumina trihydrate is excellent for a wide variety of applications.

As a result of further investigations on the above propylene resin composition, it was found that a resin composition which is suitable for use in a wide number of fields could be obtained by varying the proportion of a propylene polymer and alumina trihydrate, incorporating other materials into the resin composition according to the end use need and/or subjecting the resin composition to surface treatments.

SUMMARY OF THE INVENTION

The object of this invention is, therefore, to provide a propylene resin composition and moldings prepared therefrom having excellent flexibility, tear strength, toughness, impact strength, resistance to chemicals and arcs, electrical insulating property and non-flammability as well as improved printing and marking properties on the surfaces of the moldings.

In addition to the above features, the propylene resin composition of this invention is characterized in that the resin composition and moldings prepared from the resin composition evolve a relatively small amount of heat when subjected to combustion but are not flammable at all.

DETAILED DESCRIPTION OF THE INVENTION

The propylene polymers which can be used in the present invention include both a propylene homopolymer and a copolymer of propylene and one or more components which are copolymerizable with propylene, the copolymer containing at least 80 mol% % of propylene. Examples of the components which are copolyimerizable with propylene are α-olefins other than propylene such as ethylene or higher α-olefins other than propylene, e.g., α-olefins higher than propylene preferably with up to 5 carbon atoms. In certain embodiments it is especially preferred to use diolefin copolymers (with at least 80 mol% propylene).

It is to be understood that in view of the fact that the copolymers used contain at least 80 mol% propylene, the monomer copolymerized with propylene is not especially limited so long as the essential characteristics of the copolymer meet the guidelines set out below. Generally, propylene polymers having a relatively high molecular weight having a melt index of less than 20.0 g/10 minutes as determined under a load of 2.16 Kg at a temperature of 230°C and a solubility less than 40% in boiling n-heptane are preferred. Propylene polymers having a density in the range of from 0.88 to 0.91 g/cc, even better yet 0.88 to 0.90 g/cc, are particularly preferred. The propylene polymers used in the present invention will generally have a melt index of 0.1 to 20.

These propylene polymers are now produced on an industrial scale using a catalytic system comprising transition metal compounds and organometallic compounds as the main components (the so-called Ziegler Catalyst method) and are widely used in various fields. Generally speaking, the minimum % solubles is set by the difficulty/cost of propylene polymer production, and while values approaching complete 0% insolubles are theoretically possible, e.g., 0.1% solubles, most commercial propylene polymers contain a minimum of on the order of 5% solubles.

The propylene polymers (hereafter, unless otherwise indicated, this term includes both homopolymers and copolymers of at least 80 mol% propylene) are blended in an amount of 5 to 60 weight parts propylene polymer with 95 to 40 weight parts of alumina trihydrate having a gibbsite crystal structure as defined below to provide the propylene resin compositions of the present invention, the alumina trihydrate having a gibbsite crystal structure having an average particle diameter of 100 microns or less.

Alumina hydrates are roughly classified by their crystal structures into the gibbsite type [$\alpha$-Al(OH)$_3$], the bayerite type [$\beta$-Al(OH)$_3$] and the boehmite type [$\alpha$-AlO(OH)], and they are now produced on an industrial scale and widely used.

In the propylene resin composition of this invention, it is necessary to use alumina trihydrate having a gibbsite crystal structure and at least 0.20 percent by weight of sodium compounds calculated as Na$_2$O fixed in the crystal lattice (in view of the heat decomposition temperature of the alumina hydrates). Alumina trihydrate having a gibbsite crystal structure has a monoclinic crystal system in which the lattice constant is measured as a = 8.62 A, b = 5.06 A and c = 9.70 A, the beta angle is 85°26′, and the refractive index is expressed as $\alpha$= 1.568, $\beta$= 1.568 and $\gamma$= 1.587. The heat decomposition temperature of the above alumina trihydrate is above 160°C. The alumina trihydrate used in the present invention preferably has an average particle diameter of at most 100 microns, preferably less than 100 microns, more preferably in the range of from 1 to 70 microns.

As described above, the alumina trihydrate should have at least 0.20% by weight of sodium compounds calculated as Na$_2$O fixed in the crystal lattice of alumina trihydrate since it has been found that alumina trihydrate satisfying the above requirements can intimately be mixed with the propylene polymer, i.e., it offers a good "compatibility" with the propylene polymer recited herein. The term "good compatibility" used herein means that the alumina trihydrate has a high affinity for the propylene polymers. This results in the increase of toughness properties such as tear strength, among other mechanical properties, when moldings are produced from the resin composition.

The compatibility of the alumina trihydrate can be determined by taking advantage of the fact that it is easily swollen by organic solvents. More specifically, the compatibility can be determined by allowing the alumina trihydrate to swell and disperse in tetralin for a certain period of time and observing the dispersion state of the alumina trihydrate. In one embodiment, 0.5 g of alumina trihydrate is allowed to swell and disperse in 20 cc of tetralin at room temperature and the mixture is placed in a granduated glass test tube followed by being allowed to stand. After 24 hours standing, the degree of swelling is determined by the ratio of the volume of floating swollen alumina trihydrate to the total volume of the mixture. The higher the degree of swelling, the better the compatibility. The above described fixed sodium compounds can be defined as a portion determined by reducing water-soluble sodium compound from the total sodium compounds contained in a given alumina trihydrate.

Generally speaking, the alumina trihydrate will have in excess of 0.2% by weight fixed sodium compounds to allow a slight safety factor, but most preferably will contain less than about 5.0% by weight fixed sodium compounds, expressed as Na$_2$O in both cases.

In the case where the relatively large amount of alumina trihydrate is incorporated into a propylene polymer as in the resin composition of this invention, it has been found that alumina trihydrate having fixed sodium compounds less than 0.2% by weight expressed as Na$_2$O tends to produce white spots on the surface of moldings prepared from the resin composition and the moldings tend to have poor mechanical properties, for example, tear strength, and thereby they become brittle.

The present invention will now be further described in greater detail by referring to various embodiments encompassed in the present invention. All of embodiments fall within the scope of the present invention, but, as the following discussion will make clear, certain highly advantageous effects can be emphasized by appropriately selecting the proportion and particle size of the alumina trihydrate having a gibbsite crystal structure and, in certain cases, by an appropriate selection of the propylene polymer used. The most advantageous forms of practice of the present invention will now be described. Unless narrower or broader disclosure is provided, in all embodiments below the propylene polymer has a melt index less than 20 g/10 minutes (2.16 Kg at 230°C), and a solubles content in boiling n-heptane of less than 40%, and the alumina trihydrate of a gibbsite crystal structure with at least 0.2 by weight of sodium compounds calculated as Na$_2$O fixed in the crystal lattice has an average particle diameter of 100 microns or less.

1. In the first embodiment, the propylene resin composition of this invention comprises 60 to 10 parts by weight of a propylene polymer and 40 to 90 parts by weight of alumina trihydrate of a gibbsite crystal structure. The resin composition of this embodiment may contain 0.1 to 5 parts by weight of a metal salt of a higher aliphatic acid per 100 parts of the resin composition. The resin compositions obtained in this embodiment are excellent in mechanical properties such as flexibility, rigidity and impact strength and in resistance against various chemicals. These resin compositions produce a relatively small amount of heat of combustion and black smoke when the moldings produced from the resin compositions are subjected to combustion, but are not easily flammable.

Suitable polypropylene polymers which can be used in the polypropylene composition of this embodiment are relatively high density polypropylene homopolymers and copolymers containing at least 80 mol% of propylene and less than 20 mol% of ethylene or other $\alpha$-olefins, for example, butene-1. Relatively high molecular weight propylene polymers having a solubility less than 40% in boiling n-heptane and a melt index less than 4.0 g/10 minutes as measured under a load of 2.16 Kg at a temperature of 230°C are especially preferred.

The alumina trihydrate having a gibbsite crystal structure which is useful in this embodiment has an average particle size less than 10 microns, preferably less than 2 microns. It was found experimentally that a resin composition containing an alumina trihydrate having an average particle size greater than 10 microns does not provide the desired mechanical properties such as impact strength, flexibility and rigidity. The general rule regarding the alumina trihydrate used in this embodiment is that the smaller the particle size, the better, with minimum size being set by economic factors, i.e., it is expensive to manufacture extremely small particles.

The proportion of the ethylene polymer and alumina trihydrate in this embodiment is 60–10 : 40–90, preferably 50–25 : 50–75, by weight. If the alumina trihydrate is used in a proportion greater than 90% by weight, the resin composition shows a poor melt flow and cannot successfully be molded into various moldings as described above. On the other hand, when the alumina trihydrate is used in a proportion less than 40 parts by weight, the impact strength of the resin composition is not improved.

In the resin composition of this embodiment, excellent mechanical properties such as impact strength and flexibility can be obtained from the resin composition consisting of two components, i.e., a propylene polymer and an alumina trihydrate. However, the addition of 0.1 to 5 parts by weight of a metal salt of a higher aliphatic acid based on 100 parts by weight of the resin composition generally improves the mechanical properties and also makes it possible to obtain moldings having excellent surfaces. The metal and higher aliphatic alcohol selected to form the salt are not overly critical in the present invention, and the exact materials involved can be freely selected.

The metal salt of a higher aliphatic acid which can be used in the resin composition includes those having 11 to 18 carbon atoms in the aliphatic acid moiety. Examples of the metal are calcium, aluminum, magnesium, barium, cadmium, zinc and lead. Specific preferred examples of the metal salts are calcium stearate, barium stearate and lead stearate. When the metal salt is incorporated into the resin composition in a proportion greater than 5 parts by weight, no further improvement in the mechanical properties and the surface condition can be obtained as compared with a resin composition containing 5 parts by weight of the metal salt.

The resin compositions of this embodiment can be obtained by any procedures commonly employed in the resin industry, for example, by using a roll mill, a Banbury mixer or a melt extrusion procedure. Alternatively, they can be obtained by dissolving the propylene polymer in an organic solvent to which the alumina trihydrate and/or the metal salt of a higher aliphatic acid has been added and adding an appropriate non-solvent for the propylene polymer such as lower alcohols to the solution to precipitate the propylene polymer, thereby producing an intimate mixture of the alumina trihydrate and the propylene polymer and (optional) metal salt.

The resin composition thus obtained can be molded into various moldings, for example, films, boards and the like by any known procedure such as calender molding, injection molding or extrusion molding.

The moldings prepared from the above resin composition are excellent in mechanical properties such as impact strength and flexibility in spite of the large content of alumina trihydrate. Further, since the resin compositions contain a relatively small amount of propylene polymer(s), the moldings prepared from the resin compositions can be subjected to combustion for disposal with only a small amount of black smoke or soot and heat of combustion being produced. The moldings are flame-retarding and have a remarkable resistance against various chemicals.

The above resin composition can contain synthetic resins which can be admixed with the propylene polymer such as ethylene polymers and elastomers such as ethylene-propylene copolymer rubbers (EPR), ethylene-propylene-diene terpolymers (EPDM), and butadiene-type rubbers, for example, styrene-butadiene rubber (SBR). Also, depending upon the specific applications of the resin composition, various additives such as light (for example, ultraviolet rays), oxygen, ozone and heat stabilizers, flame retardants, plasticizers, reinforcing agents as well as fillers, coloring agents, antistatic agent, antiblocking agents, decomposition accelerators and the like can be present. These compositions are also included within the scope of this invention.

The resin composition of this embodiment has various advantages as described above and can be molded into various articles useful for a wide variety of applications. Examples of the articles are synthetic papers, corrugated cardboard boxes, boards, and materials for floors, walls, partitions, ceilings, pipes and the like.

The moldings prepared by the above conventional procedures can be subjected to a surface treatment with an aqueous solution of sodium aluminate having a concentration of 5 to 20% by weight at a temperature of 20° to 98°C to improve the marking and printing properties of the surface. In this connection, an aqueous solution of sodium aluminate having a concentration greater than about 20% by weight is very difficult to obtain because of the solubility of sodium aluminate in water. Also, the aqueous solution of sodium aluminate may contain an excess amount of sodium hydroxide (above saturation).

The moldings of the resin composition which have been treated with an aqueous solution of sodium aluminate are excellent in surface whiteness, printing and marking properties as well as mechanical properties such as flexibility, tear strength and abrasion resistance. They are also flame-retarding and excellent in electric properties such as resistance to arcs and antistatic property.

2. In the second embodiment, the propylene resin composition of this invention comprises 40 to 5 parts by weight of a propylene polymer, 60 to 95 parts by weight of alumina trihydrate and 5 to 15 parts by weight, based on 100 parts by weight of the propylene polymer and alumina trihydrate, of one or more high molecular weight organic substances having a softening point below room temperature. The resin compositions of this embodiment are excellent, particularly in flexibility and flame-retardance.

Suitable propylene polymers which can be used for the propylene resin composition of this embodiment include a propylene homopolymer, a copolymer of at least 80 mol% of propylene and less than 20 mol% of an α-olefin, for example, ethylene or butene-1, and a copolymer of propylene as a main component (at least 80 mol%) and a diolefin, most preferably of 4 to 8 carbon atoms, e.g., butadiene. Suitable polypropylene polymers are those having a solubility less than 40% in a boiling n-heptane, and particularly preferred propylene polymers are those having a melt index less than 20 g/10 minutes as determined under a load of 2.16 Kg at a temperature of 230°C.

The alumina trihydrate having a gibbsite crystal structure which can be used in this embodiment has an average particle diameter in the range of from 1 to 100 microns, preferably from 5 – 70 microns.

The proportion of the propylene polymer in the resin composition can vary from 40 to 5 parts by weight, preferably from 40 to 10 parts by weight, based on 100 parts by weight of the resin composition comprising the propylene polymer and the alumina trihydrate. That is, alumina trihydrate is used in a proportion of from 60 to 95 parts, preferably from 60 to 90 parts, by weight. When the alumina trihydrate is used in a proportion less than 60 parts by weight, the resulting resin composition is generally easily flammable and undesirably evolves a relatively large amount of black smoke (soot) and heat of combustion when moldings prepared from the resin composition are subjected to combustion. When the alumina trihydrate is used in a proportion greater than 95 parts by weight, the resin composition is difficult to mold into various moldings or it is extremely difficult to obtain moldings having a uniform composition.

The high molecular weight organic substances having a softening point below room temperature used in the resin composition of this embodiment have a molecular weight of at least 10,000 and are preferably those which do not escape from the resin composition during the molding at a high temperature. Examples of the high molecular weight organic substances are atactic polypropylene (by-products obtained in the production of crystalline polypropylene, soluble in boiling n-hexane), butadiene-containing rubbers such as those obtainable by emulsion polymerization, for example, polybutadiene rubbers, styrene-butadiene rubbers (SBR), acrylonitrile-butadiene rubbers (NBR) and the like, and non-vulcanized rubbers such as polychloroprene rubber, butadiene homopolymer rubber or styrene-butadiene block or random copolymer rubber obtainable by solution polymerization, ethylene-propylene copolymer rubbers (EPR), ethylene-propylene-diene terpolymer rubbers (EPT), isobutyl rubbers (butyl rubbers), polyisoprene rubbers, rubbers comprising mainly alkylene oxides and epihalohydrins or epihalohydrins per se, chlorinated polyolefins (for example, chlorinated polyethylene), chlorosulfonated polyethylenes and the like.

It shall be understood that there is no particular limitation on the hgh molecular weight organic substance used so long as it has a molecular weight above 10,000 and has a softening point below room temperature (approx. 20°C). These materials can generally be described as thermoplastic (non-crosslinked) and illustrating cold flow at room temperature. Obvious restrictions will, of course, be apparent to one skilled in the art, e.g., the materials should not evaporate or degrade when molded, but these are obvious processing limitations easily recognized by one skilled in the art.

As set forth previously, the high molecular weight organic substances recited above can be incorporated in a proportion of from 5 to 15 parts by weight based on 100 parts by weight of the composition comprising a propylene polymer and the alumina trihydrate. When the high molecular weight organic substance is used in a proportion less than 5 parts by weight, the moldings obtained from the resin composition do not show any improved flexibility and, on the other hand, when the organic substance is used in a proportion greater than 15 parts by weight, the ability of the moldings to retain their molded shape is extremely lowered in molding the resin composition at a temperature above the melting point of the propylene polymer, generally at a temperature in the range of from 180° to 400°c, more specifically from 200° to 300°C.

The propylene resin composition of this embodiment can be obtained by mixing the propylene polymer with either of the alumina trihydrate or the high molecular weight organic substance having a softening point below room temperature and then adding the remaining component to the resulting mixture. Alternatively, the propylene polymer, alumina trihydrate and the high molecular weight organic substance can be mixed simultaneously. The mixing can be effectd mechanically as described previously by using a roll mill, Banbury mixer or a melt extrusion.

The propylene resin composition thus obtained can be molded into various moldings such as films, boards, sheets, pipes, rods or other shapes by calender molding, injection molding or extrusion molding. However, the final molding process in the above molding procedures is advantageously carried out at a temperature in the range of from 180° to 400°c, preferably from 200° to 300°C.

The resin compositions of this embodiment are excellent in mechanical properties such as impact strength and flexibility in spite of the large content of alumina trihydrate and also they are flame-retarding. Further, since the resin composition contains a relatively small amount of propylene polymer the moldings prepared from the resin compositions can be subjected to combustion with an appreciably small amount of black smoke or soot and heat of combustion being generated.

The moldings obtained from the propylene resin composition of this embodiment can be bonded to other articles prepared from materials such as metals, for example, aluminum, iron, copper, tin and the like or alloys thereof such as brass and stainless steel, cellulosic materials, for example, paper, fiber, wood and the like, and inorganic materials such as stone, gypsum plaster, cement and the like by using an appropriate adhesive between the moldings and the articles to be bonded thereto or by incorporating into the resin composition unsaturated carboxylic acids having an adhesive property.

Suitable unsaturated carboxylic acids which can be used include aliphatic unsaturated carboxylic acids, aromatic unsaturated carboxylic acids and alicyclic unsaturated carboxylic acids or derivatives thereof. Preferred unsaturated carboxylic acids are fumaric acid, maleic acid, acrylic acid, methacrylic acid, itaconic acid, crotonic acid, oleic acid, cinnamic acid and the like. There is no particular limitation on the unsaturated carboxylic acid or acids used, and both solid and liquid acids can be used, as can be derivatives. It is, however, essential that the —COO(H)moiety in such acids be retained.

The above unsaturated carboxylic acids are generally used in a proportion of from 0.1 to 15 parts by weight, preferably from 0.1 to 10 parts by weight, based on 100 parts by weight of the resin composition. When the unsaturated carboxylic acid is used in a proportion less than 0.1 parts by weight, the resulting resin generally exhibits poor adhesiveness or does not have a uniform adhesive effect. When the unsaturated carboxylic acid is used in a proportion greater than 15 parts by weight, the resin composition still retain a satisfactory adhesiveness but exhibits no additional increase in adhesiveness as compared with the resin composition containing 15 parts by weight of unsaturated carboxylic acids. Rather, the use of unsaturated carboxylic acids in a proportion greater than 15 parts by weight sometimes deteriorates certain physical properties of the resin composition, for example, rigidity and heat resistance. Suitable shapes of articles to be bonded to the moldings of the resin composition are films, sheets, toils, textiles, boards, pipes, powders, rods and the like.

Although the resin composition of this embodiment can be used as a composition comprising a propylene resin, alumina trihydrate and one or more high molecular weight organic substances having a softening agent below room temperature, it can effectively be used as a blend with other synthetic resins depending upon the specific utility of the articles prepared from the resin composition. Further, additives commonly used in olefinic resins such as light (ultraviolet rays), oxygen, ozone and heat stabilizers, flame retardants, copper inhibitors, reinforcing agents, plasticizers and other fillers, coloring agents, coloring improving agents, antistatic agents, decomposition accelerators and electrical property improving agents can be incorporated into the resin composition. These blends are also encompassed within the scope of this invention.

The propylene resin composition thus obtained are excellent in flame-retardance and flexibility as described above, and can be used in a wide variety of utilities by molding into various shapes. Examples of the utility of the resin composition are sheets, boards or composites thereof for exterior materials in the architectural field, materials for automobiles and ships, and industrial materials.

Generally speaking, any molding used to process the propylene resins of this invention will be conducted at a temperature above the softening point of the resin components but below the decomposition point of the resin components or the alumina trihydrate (alumina trihydrate generally shows substantial decomposition in the area of 220° – 230°C). Other than this factor, other conditions are not overly critical and can be selected in accordance with art recognized techniques.

The present invention will now be further illustrated by the following examples, but they are not to be construed as limiting the present invention.

In the examples, various physical and chemical properties were determined by the following methods.

1. torsional rigidity was determined based on the Japanese Industrial Standards (hereinafter JIS) K 6745 at a temperature of 20°C.

2. Izod impact strength was determined based on ASTM D-256 at a temperature of 20°C.

3. Tear strength was determined based on JIS p 8116 at a temperature of 20°C.

4. Heat of combustion was determined based on JIS K 2279.

5. Arc resistance was determined based on ASTM D 495.

6. Flame retarding property was determined based on ASTM D2863 in terms of oxygen index.

7. Thermal conductivity, which indicates the heat insulating and heat accumulating properties, was determined based on JIS A 1412.

8. Heat insulating property was determined by heating a test piece of the heat accumulating and heat insulating composite plate having the dimensions of 30 cm length, 30 cm width and 1 cm thickness in a thermostatically controlled container maintained at a temperature of 60° ± 1°C, and, after the temperature of the plate reached 60° ± 1°C, placing the plate in an environment kept at 23° ± 1°C and measuring the surface temperature of the plate at constant intervals.

9. Surface condition of the moldings was rated by observing the presence or absence of secondary aggregates (appearing as white spots) due to poor dispersibility of fillers in the moldings. When the surface of the moldings presents a uniform glossy whiteness, it is referred to as a good surface condition.

10. Acid resistance was determined by immersing a test piece of a molded sheet in a 20% aqueous solution of hydrochloric acid for 10 hours for etching and, after washing the test piece thus treated with water, measuring the tear strength of the test piece according to the tear strength determination test described in (3) above. The acid resistance is indicated in terms of percent decrease in the tear strength in the HCl etched test piece as compared with the tear strength of an untreated molded sheet.

11. Cloud point was determined based on JIS K 6714.

12. Gloss was determined based on JIS Z 8741.

13. Marking and printing properties were determined by comparing the markability of the test piece with that of cellulose papers, and also by dropping water droplets on the surface and observing the tendency of water droplets to combine.

14. Electrostatic charging was determined by applying a voltage of 10 KV for 3 seconds to a test piece to charge the test piece and recording the time required for electrostatic charge to reduce to one-half of the initial charge.

15. Adhesive strength was determined based on ASTM D 903-49.

EXAMPLE 1

50 parts by weight of a propylene homopolymer containing 22% by weight of soluble materials in boiling n-heptane and having a melt index of 2.0 g/10 minutes as determined under a load of 2.16 Kg at a temperature of 230°C and a density of 0.89 g/cc, 50 parts by weight of an alumina trihydrate powder having a gibbsite crystal structure and an average particle size of 1.5 microns (bulk density, 1.24 g/cc; fixed sodium compounds, 0.36% calculated as $Na_2O$; total sodium compounds (water soluble and insoluble), 0.5%; water soluble sodium compounds, 0.14%; all based on total alumina trihydrate weight; degree of swelling, 0.37 cc/cc as determined by the procedure described previously, hereinafter the same alumina trihydrate of the same chemical composition was used, though particle size (and, of course, bulk density) occasionally varied, unless otherwise indicated), and 3 parts by weight of calcium stearate were blended in a twin-art kneader at a temperature of from 160° to 170°C for about 10 minutes. The resulting blend was then molded into a sheet having a thickness of 1 mm using an 8-inch roll maintained at 140°C. The sheet thus obtained was then cut into pellets using a sheet cutter. The resulting pellets were then molded at 200°C into a No. 1 dumbbell shape specified in ASTM using a 1-ounce injection molding machine. Thus dumbbell-shaped sample was allowed to stand for 24 hours at a temperature of about 20°C. This dumbbell-shaped sample had the following properties:

Izod Impact Strength: 6.83 ft.lb/in.
Torsional Rigidity: 3.14 × 10² Kg/cm²

COMPARATIVE EXAMPLE 1

A dumbbell-shaped sample was prepared in the same manner as described in Example 1 but using the propylene homopolymer alone. The sample thus obtained had the following properties:

Izod Impact Strength: 1.97 ft.lb/in.
Torsional Rigidity: 1.60 × 10³ Kg/cm²

EXAMPLE 2

A sheet was prepared in the same manner as described in Example 1 but using 55 parts by weight of the propylene homopolymer and 45 parts by weight of the alumina trihydrate used in Example 1. A dumbbell sample prepared from the resulting sheet as Example 1 had the following properties:

Izod Impact Strength: 6.21 ft.lb/in.
Torsional Rigidity: 2.73 × 10³ Kg/cm²

EXAMPLE 3

A sheet was prepared in the same manner as described in Example 1 but using 35 parts by weight of the propylene homopolymer and 65 parts by weight of the alumina trihydrate used in Example 1. A dumbbell sample prepared from the resulting sheet as Example 1 has the following properties:

Izod Impact Strength: 4.95 ft.lb/in.
Torsional Rigidity: 3.52 × 10³ Kg/cm²

COMPARATIVE EXAMPLE 2

A sheet was prepared in the same manner as described in Example 1 but using 70 parts by weight of the propylene homopolymer and 30 parts by weight of the alumina trihydrate used in Example 1. A dumbbell sample prepared from the resulting sheet as Example 1 has the following properties:

Izod Impact Strength: 1.95 ft.lb/in.
Torsional Rigidity: 2.46 × 10³ Kg/cm²

COMPARATIVE EXAMPLE 3

A blend was prepared in the same manner as described in Example 1 but using 5 parts by weight of the propylene homopolymer and 95 parts by weight of the alumina trihydrate used in Example 1. An attempt was made to prepare a sheet, but this attempt failed.

COMPARATIVE EXAMPLE 4

A sheet was prepared in the same manner as described in Example 1 but using an alumina trihydrate having an average particle size of 15 microns. A dumbbell sample prepared from the resulting sheet as Example 1 had the following properties:

Izod Impact Strength: 0.89 ft.lb/in.
Torsional Rigidity: 2.96 × 10³ Kg/cm²

EXAMPLE 4

A. A sheet was prepared in the same manner as described in Example 1 but using a propylene homopolymer containing 12% by weight of soluble materials and having a melt index of 1.7 g/10 minutes and a density of 0.90 g/cc. A dumbbell sample prepared from the resulting sheet had the following properties:

Izod Impact Strength: 2.47 ft.lb/in.
Torsional Rigidity: 4.45 × 10³ Kg/cm²

B. A dumbbell sample prepared in the same manner as described in (A) above not using the propylene homopolymer alone had the following properties:

Izod Impact Strength: 2.43 ft.lb/in.
Torsional Rigidity: 1.74 × 10³ Kg/cm²

EXAMPLE 5

A. A sheet was prepared in the same manner as described in Example 1 but using a propylene homopolymer containing 6.0% by weight of soluble materials and having a melt index of 7.2 g/10 minutes and a density of 0.91 g/cc. A dumbbell sample prepared from the resulting sheet had the following properties:

Izod Impact Strength: 1.15 ft/lb/in.
Torsional Rigidity: 6.34 × 10³ Kg/cm²

B. A dumbbell sample prepared in the same manner as described in (A) above but using the propylene homopolymer alone had the following properties:

Izod Impact Strength: 0.40 ft.lb/in.
Torsional Rigidity: 3.14 × 10³ Kg/cm²

EXAMPLE 6

A sheet was prepared in the same manner as described in Example 5 but using 55 parts by weight of the propylene homopolymer and 45 parts by weight of the alumina trihydrate. A dumbbell sample prepared from the resulting sheet as in Example 5 had the following properties:

Izod Impact Strength: 1.11 ft.lb/in.
Torsional Rigidity: 7.42 × 10³ Kg/cm²

EXAMPLE 7

A sheet was prepared in the same manner as described in Example 5 but using 35 parts by weight of the propylene homopolymer and 65 parts by weight of the alumina trihydrate. A dumbbell sample prepared from the resulting sheet had the following properties:

Izod Impact Strength: 0.80 ft.lb/in.
Torsional rigidity: 49.9 × 10³ Kg/cm²

COMPARATIVE EXAMPLE 5

A sheet was prepared in the same manner as described in Example 5 but using 70parts by weight of the propylene homopolymer and 30 parts by weight of the alumina trihydrate and a dumbbell sample was prepared from the resulting sheet as in Example 5. The dumbbell sample thus obtained had the following properties:

Izod Impact Strength: 0.26 ft.lb/in.
Torsional Rigidity: 7.58 × 10³ Kg/cm²

COMPERATIVE EXAMPLE 6

A sheet was prepared in the same manner as described in Example 5 but using an alumina trihydrate having an average particle size of 50 microns. A dumbbell sample was prepared from the resulting sheet as in Example 5 and was found to have the following properties:
Izod Impact Strength: 0.50 ft.lb/in.
Torsional Rigidity: 6.20 × 10³ Kg/cm²

COMPARATIVE EXAMPLE 7

A sheet was prepared in the same manner as described in Example 1 but using a propylene homopolymer containing 3% by weight of soluble materials and having a melt index of 2.0 g/10 minutes and a density of 0.91% g/cc. A dumbbell prepared from the resulting sheet as in Example 1 was found to have an Izod impact strength of 0.40 ft.lb/in. with almost no improvement being observed in torsional rigidity.

COMPARATIVE EXAMPLE 8

A sheet was prepared in the same manner as described in Example 1 but using an alumina hydrate having a boehmite crystal structure [α-AlO(OH)] and having an average particle size of 2.0 microns. A dumbbell sample prepared from the resulting sheet as in Example 1 had the following properties:
Izod Impact Strength: 0.82 ft.lb/in.
Torsional Rigidity: 4.25 × 10³ Kg/cm²

COMPARATIVE EXAMPLE 9

A sheet was prepared in the same manner as described in Example 1 but using an alumina hydrate having a bayerite crystal structure [β-Al(OH)₃] and having an average particle size of 1.8 microns in place of the alumina trihydrate used in Example 1. A dumbbell sample prepared from the resulting sheet had the following properties:
Izod Impact Strength: 0.95 ft.lb/in.
Torsional Rigidity: 3.88 × 10³ Kg/cm²

COMPARATIVE EXAMPLE 10

A sheet was prepared in the same manner as described in Example 2 but using calcium carbonate having an average particle size of 6.5 microns in place of the alumina trihydrate used in Example 2. A dumbbell sample prepared from the resulting sheet had the following properties:
Izod Impact Strength: 0.48 ft.lb/in.
Torsional Rigidity: 6.65 × 10³ Kg/cm²

COMPARATIVE EXAMPLE 11

A sheet was prepared in the same manner as described in Example 2 but using calcium sulfate dihydrate having an average particle size of 8.5 microns in place of the alumina trihydrate used in Example 2. A dumbbell sample prepared from the resulting sheet had the following properties:
Izod Impact Strength: 0.95 ft.lb/in.
Torsional Rigidity: 5.79 × 10³ Kg/cm²

EXAMPLE 8

A sheet was prepared in the same manner as described in Example 1 but using no calcium stearate as was used in Example 1. A dumbbell sample prepared from the resulting sheet had the following properties:
Izod Impact Strength: 6.50 ft.lb/in.
Torsional Rigidity: 3.09 × 10³ Kg/cm²

EXAMPLE 9

15 parts by weight of the propylene homopolymer and 85 parts by weight of the alumina trihydrate having a gibbsite crystal structure used in Example 1 were mixed in the same manner as described in Example 1. The resulting mixture was immediately supplied to a calender roll maintained at a temperature of 150°C to form a sheet having a thickness of about 0.6 mm and the sheet was then passed through a second calender roll maintained at room temperature to form a sheet having a thickness of about 0.5 mm. The sheet thus prepared showed a good surface condition (uniform and glossy) and had the following properties:
Torsional Rigidity: 1.47 × 10³ Kg.cm² (longitudinal direction), 1.42 × 10³ Kg/cm² (lateral direction)
Tear Strength: 15.2 Kg/cm (longitudinal direction), 17.3 Kg/cm (lateral direction)
Heat of Combustion: 1,660 Kcal/kg
Oxygen Index: 29.9 (flame-retarding)
Acid Resistance: 0% (in both longitudinal and lateral directions)
Arc Resistance: 241 seconds

EXAMPLE 10

A sheet was prepared in the same manner as described in Example 8 but using 30 parts by weight of the same propylene homopolymer and 70 parts by weight of the same alumina trihydrate as were used in Example 8. The resulting sheet was found to have a good surface condition and had the following properties:
Torsional Rigidity: 1.07 × 10³ Kg/cm² (longitudinal direction), 1.32 × 10³ Kg/cm² (lateral direction)
Tear Strength: 10.4 Kg/cm (longitudinal direction), 12.9 Kg/cm (lateral direction)
Heat of Combustion: 3,320 Kcal/kg
Oxygen Index: 28.7 (flame-retarding)
Acid Resistance: 0% (in both longitudinal and lateral directions)
Arc Resistance: 209 seconds

EXAMPLE 11

A sheet was prepared in the same manner as described in Example 8 but using 50 parts by weight of the propylene homopolymer and 50 parts by weight of the alumina trihydrate as were used in Example 8. The resulting sheet was found to have a good surface condition and had the following properties:
Torsional Rigidity: 1.31 × 10² Kg/cm² (longitudinal direction), 1.05 × 10² Kg/cm² (lateral direction)
Tear Strength: 8.6 Kg/cm (longitudinal direction), 11.0 Kg/cm (lateral direction)
Heat of Combustion: 5,420 Kcal/kg
Oxygen Index: 27.0 (flame-retarding)
Acid Resistance: 0% (in both longitudinal and lateral directions)
Arc Resistance: 160 seconds

COMPARATIVE EXAMPLE 12

A sheet was prepared in the same manner as described in Example 8 but using 70 parts by weight of the propylene homopolymer and 30 parts by weight of the alumina trihydrate as were used in Example 8. The resulting sheet was found to have a good surface condition and had the following properties:
Torsional Rigidity: 1.54 × 10² Kg/cm² (longitudinal direction), 1.34 × 10² Kg/cm² (lateral direction)
Tear Strength: 7.0 Kg/cm (longitudinal direction), 18.8 Kg/cm (lateral direction)

Heat of Combustion: 7,760 Kcal/kg
Oxygen Index: 22.2 (easily flammable)
Acid Resistance: 0% (in both longitudinal and lateral directions)
Arc Resistance: 108 seconds

COMPARATIVE EXAMPLE 13

A sheet was prepared in the same manner as described in Example 9 but using calcium carbonate of substantially the same size as the alumina trihydrate in place of the alumina trihydrate. The resulting sheet had a slightly poor surface condition (slightly lacking uniformity and having white spots) and had the following properties:

Torsional Rigidity: $2.37 \times 10^3$ Kg/cm$^2$ (longitudinal direction), $2.00 \times 10^3$ Kg/cm$^2$ (lateral direction)
Tear Strength: 9.8 Kg/cm (longitudinal direction), 9.9 Kg/cm (lateral direction)
Heat of Combustion: 3,180 Kcal/kg
Oxygen Index: 21.5 (easily flammable)
Acid Resistance: 24% (longitudinal direction) 27% (lateral direction)
Arc Resistance: 150 seconds

COMPARATIVE EXAMPLE 14

A sheet was prepared in the same manner as described in Example 9 but using calcium sulfate dihydrate having an average particle size of 8.5 microns in place of the alumina trihydrate. The resulting sheet had a slightly poor surface condition (lacking uniformity and having white spots) and had the following properties:

Torsional Rigidity: $2.17 \times 10^3$ Kg/cm$^2$ (longitudinal direction), $2.65 \times 10^3$ Kg/cm$^2$ (lateral direction)
Tear Strength: 8.3 Kg/cm (longitudinal direction), 9.3 Kg/cm (lateral direction)
Heat of Combustion: 3,180 Kcal/kg
Oxygen Index: 22.7 (easily flammable)
Acid Resistance: 17% (longitudinal direction) 41% (lateral direction)
Arc Resistance: 132 seconds

COMPARATIVE EXAMPLE 15

A sheet was prepared in the same manner as described in Example 8 but using 18.7 parts by weight of a propylene homopolymer containing 69% by weight of soluble substances in boiling n-heptane and having a melt index of 3.4 g/10 minutes and a density of 0.89 g/cc. The resulting sheet was found to have a good surface condition and had the following properties:

Torsional Rigidity: $0.76 \times 10^2$ Kg/cm$^2$ (longitudinal direction), $0.86 \times 10^3$ Kg/cm$^2$ (lateral direction)
Tear Strength: 11.0 Kg/cm (longitudinal direction), 14.2 Kg/cm (lateral direction)
Oxygen Index: 31.0 (flame-retarding)
Acid Resistance: 0% (in both longitudinal and lateral directions)
Arc Resistance: 196 seconds

EXAMPLE 12

30 parts by weight of a propylene homopolymer containing 22% by weight of soluble materials in boiling n-heptane and having a melt index of 2.0 g/10 minutes as measured under the same conditions as described in Example 1 and a density of 0.89 g/cc and 70 parts by weight of an alumina trihydrate having a gibbsite crystal structure and having an average particle size of 40 microns were mixed in a pressurized twin-arm kneader at a temperature of $160° \pm 5°C$ for about 15 minutes. The resulting mixture was supplied to a calender roll maintained at a temperature of 150°C to form a sheet having a thickness of 0.16 mm. The sheet thus obtained was then stretched in a 10% aqueous solution of sodium aluminate at a temperature of from 90° to 95°C over a 5-minute period to prepare a sheet having a thickness of 0.15 mm. The sheet thus treated had the following properties:

Tear Strength: 5.1 Kg/cm (longitudinal direction), 7.0 Kg/cm (lateral direction), (well balanced mechanically)
Cloud Point: 91.9%
Gloss: 4.1%
Whiteness: Good
Surface Condition: Uniform
Markability: Good
Electrostatic Charging: 3 seconds
Heat of Combustion: 3,200 Kcal/kg
Oxygen Index: 28.7 (flame-retarding)

The same sheet as above which was not subjected to the above treatment with aqueous sodium aluminate had the following properties:

Cloud Point: 76.3%
Gloss: 22.8%
Whiteness: Insufficient
Markability: Poor
Electrostatic Charging: 126 seconds

EXAMPLE 13

A sheet was prepared in the same manner as described in Example 11 but using 50 parts by weight of the propylene homopolymer and 50 parts by weight of the alumina trihydrate used in Example 11 and the resulting sheet was treated with the aqueous solution of sodium aluminate as described in Example 11. The sheet thus obtained had the following properties:

Tear Strength: 7.9 Kg/cm (longitudinal direction), 10.11 Kg/cm (lateral direction)
Cloud Point: 89.2%
Gloss: 5.3%
Whiteness: Good
Surface Condition: Uniform
Markability: Good
Electrostatic Charging: 6 seconds
Heat of Combustion: 5,400 Kcal/kg
Oxygen Index: 27.0 (flame-retarding)

EXAMPLE 14

A sheet was prepared in the same manner as described in Example 11 but using 15 parts by weight of the propylene homopolymer and 85 parts by weight of the alunina trihydrate used in Example 11 and the resulting sheet was treated with the aqueous solution of sodium aluminate as described in Example 11. The sheet thus obtained had the following properties:

Tear Strength: 4.9 Kg/cm (longitudinal direction) 6.8 Kg/cm (lateral direction)
Cloud Point: 92.4%
Gloss: 3.6%
Whiteness: Good
Surface Condition: Uniform
Markability: Fairly good
Electrostatic Charging: 1 second
Heat of Combustion: 1,660 Kcal/kg
Oxygen Index: 29.9 (flame-retarding)

COMPARATIVE EXAMPLE 16

A sheet was prepared in the same manner as described in Example 11 but using 70 parts by weight of the propylene homopolymer and 30 parts by weight of the alumina trihydrate used in Example 11, and the resulting sheet was treated with an aqueous solution of sodium aluminate as described in Example 11. The sheet thus obtained had the following properties:

Tear Strength: 7.0 Kg/cm (longitidinal direction), 18.8 Kg/cm (lateral direction)
Cloud Point: 79.0%
Gloss: 33.0%
Whiteness: Poor
Markability: Poor
Electrostatic Charging: more than 300 seconds
Heat of Combustion: 7,800 Kcal/kg
Oxygen Index: 18.8 (easily flammable)

COMPARATIVE EXAMPLE 17

An attempt was made to prepare a sheet from 5 parts by weight of the propylene homopolymer and 95 parts by weight of the alumina trihydrate used in Example 11 in the same manner as described in Example 11, but this attempt failed.

EXAMPLE 15

A sheet was prepared in the same manner as described in Example 11 but using a 7% aqueous solution of sodium aluminate in place of the 10% aqueous solution of sodium aluminate. The sheet thus obtained had the following properties:

Tear Strength: 6.5 Kg/cm (longitudinal direction), 10.0 Kg/cm (lateral direction)
Cloud Point: 36.3%
Gloss: 8.2%
Whiteness: Good
Surface Condition: Uniform
Markability: Good
Electrostatic Charging: 3 seconds
Heat of Combustion: 3,300 Kcal/kg
Oxygen Index: 28.5 (flame-retarding)

EXAMPLE 16

A sheet was prepared in the same manner as described in Example 11 but using a 1.6% aqueous solution of sodium aluminate in place of the 10% aqueous solution of sodium aluminate. The sheet thus obtained had the following properties:

Tear Strength: 4.9 Kg/cm (longitudinal direction), 6.9 Kg/cm (lateral direction)
Cloud Point: 91.7%
Gloss: 3.8%
Whiteness: Good
Surface Condition: Uniform
Markability: Good
Electrostatic Charging: 3 seconds
Heat of Combustion: 3,300 Kcal/kg
Oxygen Index: 28.8 (flame-retarding)

COMPARATIVE EXAMPLE 18

A sheet was prepared in the same manner as described in Example 11 with the exception that the resulting sheet was treated with a 2% aqueous solution of sodium hydroxide at a temperature of 98°C for 24 hours in place of the treatment with the aqueous solution of sodium aluminate. The sheet thus obtained showed whiteness, but was a brittle due to degradation.

COMPARATIVE EXAMPLE 19

A sheet was prepared in the same manner as described in Example 11 with the exception that the resulting sheet was treated with concentrated sulfuric acid at a temperature of 30°C for 24 hours. In this treatment, the alumina trihydrate was not eluted from the sheet but almost no whiteness was obtained.

EXAMPLE 17

A sheet was prepared in the same manner as described in Example 11 but further adding 3.0% by weight of calcium stearate to the resin composition consisting of the propylene homopolymer and the alumina trihydrate as in Example 11 and the resulting sheet was treated with an aqueous solution of sodium aluminate as in Example 11. The sheet thus obtained had the following properties:

Tear Strength: 5.5 Kg/cm (longitudinal direction), 7.2 Kg/cm (lateral direction)
Cloud Point: 92.1%
Gloss: 3.9%
Whiteness: Good
Surface Condition: Uniform
Markability: Good
Electrostatic Charging: 3 seconds
Heat of Combustion: 3,300 Kcal/kg
Oxygen Index: 28.5 (flame-retarding)

EXAMPLE 18

A sheet was prepared in the same manner as described in Example 16 but using aluminum sulfate in place of calcium stearate and the resulting sheet was treated with an aqueous solution of sodium aluminate as in Example 16. The sheet thus obtained had the following properties:

Tear Strength: 5.7 Kg/cm (longitudinal direction), 7.1 Kg/cm (lateral direction)
Cloud Point: 90.7%
Gloss: 4.0%
Whiteness: Good
Surface Condition: Uniform
Markability: Good
Electrostatic Charging: 3 seconds
Heat of Combustion: 3,300 Kcal/kg
Oxygen Index: 28.6 (flame-retarding)

EXAMPLE 19

22.1 parts by weight of a propylene homopolymer containing 5% by weight of atactic polymers soluble in boiling n-heptane and having a melt index of 2.0 g/10 minutes (at 230°C under a load of 2.16 Kg) and a density of 0.39 g/cc (manufactured by Japan Olefin Chemical Company under the trade name "Shoallomer'), 7.2 parts by weight of an atacic polypropylene having a molecular weight of $20 \times 10^4$ and 77.9 parts by weight of alumina trihydrate having an average particle size of 46 microns were kneaded in a twin-art kneader at a temperature of from 160° to 170°C for 10 minutes and immediately thereafter a sheet having a thickness of about 2 mm was prepared by hot roll maintained at 155° ± 5°C. The resulting sheet was then heat-pressed using a hot press at about 250°C under a pressure of 1 Kg/cm² for 3 minutes to prepare a foamed sheet. The foamed sheet contained uniform discrete voids having a bulk density of about 0.9. The foamed sheet was stretched by passing through a 10 inch roll at room temperature while maintaining the clearance of the roll at 1.5 mm. The resulting stretched sheet was found to have a torsional rigidity of 560 Kg/cm² in the longitudinal direction and 570 Kg/cm² in the lateral direction, and also to be flame retarding, having an oxygen index of 28.7.

EXAMPLE 20

A sheet was prepared in the same manner as described in Example 18 but using 40 parts by weight of the propylene homopolymer, 10 parts by weight of the atactic polyproylene and 60 parts by weight of the alumina trihydrate. The resulting foamed sheet had a bulk density of about 0.6. The foamed sheet was then stretched using a roll at room temperature. The stretched sheet thus obtained was found to have a torsional rigidity of 22.0 Kg/cm² in the longitudinal direction and 19.2 Kg/cm² in the lateral direction and also to be flame-retarding, having an oxygen index of 27.0.

EXAMPLE 21

A sheet was prepared in the same manner as described in Example 18 but using 10.0 parts by weight of the propylene homopolymer, 10.0 parts by weight of the atactic polypropylene and 90.0 parts by weight of the alumina trihydrate. The sheet was then foamed in the same manner as described in Example 18. The resulting foamed sheet had a bulk density of about 1.0. The foamed sheet was then stretched using a roll at room temperature. The stretched sheet thus obtained was found to have a torsional rigidity of 180 Kg/cm² in the longitudinal direction and 200 Kg/cm² in the lateral direction and also to be flame-retarding, having an oxygen index of 29.4.

COMPARATIVE EXAMPLE 20

A blend was prepared in the same manner as described in Example 18 except for using 6 parts by weight of the propylene homopolymer, 3 parts by weight of the atactic polypropylene and 94 parts by weight of the alumina trihydrate, but blending was difficult due to poor flowability.

COMPARATIVE EXAMPLE 21

A foamed sheet was prepared in the same manner as described in Example 18 except for using 50 parts by weight of the propylene homopolymer, 2 parts by weight of the atactic polypropylene and 50 parts by weight of the alumina trihydrate, but separate phases of the resin and the inorganic filler were observed which rendered the resulting foamed sheet brittle and, therefor, it was difficult to maintain the shape of the sheet.

COMPARATIVE EXAMPLE 22

An attempt was made to prepare a sheet in the same manner as described in Example 18 except for using 15 parts by weight of the propylene homopolymer, 18 parts by weight of the atactic polypropylene and 85 parts by weight of the alumina trihydrate, but this attempt failed due to the extremely high viscosity of the blend of the propylene hoompolymer and the alumina trihydrate.

EXAMPLE 22

A foamed sheet was prepared in the same manner as described in Example 18 but using butyl rubber having a molecular weight of $6.4 \times 10^4$ in place of the atactive polypropylene. The resulting foamed sheet was found to have a bulk density of 0.8. The foamed sheet was then stretched in the same manner as described in Example 18. The stretched sheet had the following properties:
Torsional Rigidity: 990 Kg/cm² (in the longitudinal direction), 820 Kg/cm² (in the lateral direction)
Oxygen Index: 29.0 (flame-retarding)

EXAMPLE 23

A foamed sheet was prepared in the same manner as described in Example 18 but using a crystalline propylene homopolymer containing 6% by weight of an atactic polymer soluble in boiling n-heptane and having a melt index of 1.7 g/10 minutes and a density of 0.90 g/cc. The foamed sheet was then stretched in the same manner as described in Example 18. The stretched sheet thus obtained had the following properties:
Torsional Rigidity: 590 Kg/cm² (in the longitudinal direction, 600 Kg/cm² (in the lateral direction)
Oxygen Index: 29.0 (flame-retarding) EXAMPLE 24

A foamed sheet was prepared in the same manner as described in Example 18 but using an ethylene-propylene-diene terpolymer rubber (manufactured by Uniroyal Company under the trade name "Royalene 502") in place of the atactic polypropylene used in Example 18. The resulting foamed sheet was then stretched in the same manner as described in Example 18. The stretched sheet thus obtained had the following properties:
Torsional Rigidity: 580 Kg/cm² (in the longitudinal direction), 565 kg/cm² (in the lateral direction)

While the invention has been described in detail and with reference to specific embodiments thereof, it will be apparent to one skilled in the art that various changes and modifications can be made therein without departing from the spirit and scope thereof.

What is claimed is:

1. A resin composition comprising:
   5 to 60 parts by weight of a propylene polymer; and
   95 to 40 parts by weight of alumina trihydrate having a gibbsite crystal structure and containing at least 0.20 percent by weight of fixed sodium compounds represented as $Na_2O$.

2. A resin composition as claimed in claim 1 where the propylene polymer has a solubles content of less than 40% in boiling n-heptane and a melt index of less than 20 g/10 minutes at 2.16 Kg at 230°C, and the alumina trihydrate has an average particle diameter of at most 100 microns.

3. The resin composition as claimed in claim 2 where the propylene polymer has density of 0.88 to 0.91.

4. A resin composition according to claim 1 comprising 60 to 10 parts by weight of the propylene polymer and 40 and 90 parts by weight of the alumina trihydrate having a gibbsite crystal structure.

5. The resin composition according to claim 4 wherein said alumina trihydrate has an average particle size less than 10 microns.

6. The resin composition according to claim 5 where the propylene polymer has a solubility of less than 40% in boiling n-heptane.

7. The resin composition according to claim 5 where the alumina trihydrate has an average particle diameter of less than 2 microns.

8. The resin composition according to claim 6 wherein the propylene polymer is a member selected from the group consisting of a high density propylene homopolymer and a high density copolymer of propylene, said copolymer containing at least 80 mol% of propylene.

9. The resin composition according to claim 8 where the density is 0.88 to 0.91.

10. The resin composition according to claim 8 where the propylene polymer is a high density homopolymer.

11. The resin composition according to claim 8 where the propylene polymer is a high density copolymer.

12. The resin composition according to claim 11 where the copolymer is of propylene and another α-olefin.

13. The resin composition according to claim 12 where the another α-olefin has up to 5 carbon atoms.

14. The resin composition according to claim 4 where the propylene polymer has a solubility of less than 40% in boiling n-heptane and a melt index less than 4.0 g/10 minutes measured under a load of 2.16 Kg at a temperature of 230°C.

15. The resin composition according to claim 4 where the resin composition contains 0.1 to 5 parts by weight of a metal salt of a higher aliphatic acid containing 11 to 18 carbon atoms per 100 parts by weight of the resin composition.

16. The resin composition according to claim 15 where the metal salt of a higher aliphatic acid is selected from the group consisting of barium stearate, calcium stearate, magnesium stearate, aluminum stearate, cadmium stearate and zinc stearate.

17. A molded article prepared from the resin composition claimed in claim 4.

18. The molded article according to claim 17 which is treated with an aqueous solution of sodium aluminate having a sodium aluminate concentration of 5 20% by weight.

19. A resin composition according to claim 1 comprising 40 to 5 parts by weight of the propylene polymer, 60 to 95 parts by weight of the alumina trihydrate and 5 to 15 parts by weight of a high molecular weight organic thermoplastic substance having a softening point below room temperature and characterized by cold flow at room temperature.

20. The resin composition according to claim 19 where the high molecular weight organic substance has a molecular weight above 10,000.

21. The resin composition according to claim 20 where the alumina trihydrate has an average particle size of 1 to 100 microns.

22. The resin composition according to claim 21 where the propylene polymer has a solubility of less than 40% in boiling n-heptane and a melt index less than 20 (2.16 Kg at 230°Kg at 230°C).

23. The resin composition according to claim 22 where the propylene polymer is a member selected from the group consisting of a high density propylene hompolymer and a high density copolymer of propylene, said copolymer containing at least 80 mol% of propylene.

24. The resin composition according to claim 23 where the propylene polymer is the homopolymer.

25. The resin composition according to claim 23 where the propylene polymer is the copolymer.

26. The resin composition according to claim 25 where the copolymer is with another α-olefin having up to 5 carbon atoms or a diolefin having 3 to 8 carbon atoms.

27. The resin composition according to claim 19 where the propylene polymer is present in a proportion in the range of from 40 to 10 parts by weight and said alumina trihydrate is present in a proportion in the range of from 60 to 90 parts by weight.

28. The resin composition according to claim 21 where the high molecular weight organic substance is selected from the group consisting of an atactic polypropylene, a polybutadiene rubber, a styrene-butadiene rubber, an acrylonitrile-butadiene rubber, a polychloroprene rubber, an ethylene-propylene copolymer rubber, an ethylene-propylene-diene terpolymer rubber, an isobutyl rubber, a polyisoprene rubber, a rubber comprising an alkylene oxide and an epihalohydrin or an epihalohydrin, a chlorinated polyolefin and a chlorosulfonated polyethylene.

29. A molded article prepared from the resin composition claimed in claim 19.

30. The resin composition according to claim 28 where the styrene-butadiene rubber is a block copolymer rubber or a random copolymer rubber.

* * * * *